United States Patent
Schneider (10) Patent No.: US 6,517,103 B1
(45) Date of Patent: Feb. 11, 2003

(54) INFLATABLE KNEE BOLSTER MODULE ASSEMBLY

(75) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/491,305

(22) Filed: Jan. 25, 2000

(51) Int. Cl.⁷ .............................................. B60R 21/22
(52) U.S. Cl. ..................... 280/730.1; 280/732; 280/753
(58) Field of Search ............................. 280/728.2, 732, 280/730.1, 753

(56) References Cited

U.S. PATENT DOCUMENTS

| | | | |
|---|---|---|---|
| 4,948,168 A | | 8/1990 | Adomeit et al. |
| 5,431,436 A | * | 7/1995 | Mossi et al. ................. 280/732 |
| 5,435,594 A | | 7/1995 | Gille |
| 5,454,588 A | * | 10/1995 | Rose ....................... 280/728.2 |
| 5,474,325 A | * | 12/1995 | Daines et al. ........ 280/728.2 X |
| 5,536,043 A | * | 7/1996 | Lang et al. ................. 280/753 |
| 5,544,911 A | * | 8/1996 | Vine ........................ 280/728.2 |
| 5,605,347 A | | 2/1997 | Karlow et al. |
| 5,630,621 A | * | 5/1997 | Schneider .................... 280/753 |
| 5,676,393 A | * | 10/1997 | Rose .................... 280/728.2 X |
| 5,775,729 A | | 7/1998 | Schneider et al. |
| 5,782,488 A | | 7/1998 | Lewis et al. |
| 5,791,680 A | * | 8/1998 | Dyer .................... 280/730.1 X |
| 5,845,935 A | * | 12/1998 | Enders et al. ............ 280/730.1 |
| 5,931,489 A | * | 8/1999 | Damman et al. ........ 280/728.2 |
| 5,931,493 A | | 8/1999 | Sutherland |
| 6,039,380 A | * | 3/2000 | Heilig et al. ................. 280/753 |
| 6,089,599 A | * | 7/2000 | Schimmoller et al. ....... 280/732 |
| 6,170,871 B1 | * | 1/2001 | Goestenkors et al. .... 280/730.1 |
| 6,345,838 B1 | * | 2/2002 | Schneider ................ 280/730.1 |

* cited by examiner

Primary Examiner—Paul N. Dickson
Assistant Examiner—Toan C To
(74) Attorney, Agent, or Firm—Sally J. Brown; James D. Erickson (57) ABSTRACT

Inflatable knee bolster module assemblies and associated methods are provided wherein first and second longitudinally spaced apart attachment extensions of a first outer lateral side of the inflatable knee cushion are passed through respectively corresponding first and second attachment openings in an associated assembly panel member.

29 Claims, 8 Drawing Sheets

INFLATABLE KNEE BOLSTER MODULE ASSEMBLY

CROSS REFERENCE TO RELATED APPLICATION

The subject matter of this application is related to prior U.S. patent application Ser. No. 728,136, filed on Jul. 12, 1996, now Schneider, U.S. Pat. No. 5,630,621, issued May 20, 1997. The disclosure of this related prior patent application is hereby incorporated by reference herein and made a part hereof, including but not limited to those portions which specifically appear hereinafter.

BACKGROUND OF THE INVENTION

This invention relates generally to automotive safety restraint devices and, more particularly, to improved inflatable knee bolster module assemblies and associated methods such as may be useful in automotive safety restraint systems.

It is well known to protect a vehicle occupant using inflatable restraint systems which incorporate a cushion or bag, e.g., an "airbag cushion," that is inflated or expanded with gas such as when the vehicle encounters a sudden deceleration, such as in the event of a collision. Such systems commonly comprise an inflatable airbag module stored behind the instrument panel of the vehicle. In such modules, the associated airbag cushion is normally housed in an uninflated and folded condition to minimize space requirements. Upon actuation of the system, such as in the event of a collision, the cushion begins to be inflated, in a matter of no more than a few milliseconds, with gas produced or supplied by a device commonly referred to as an "inflator." This causes the airbag cushion to be deployed as a protective cushion for occupants within the vehicle passenger compartment.

As installed behind the vehicle instrument panel, the folded airbag cushion and the inflator device are typically contained within a module assembly reaction canister, which canister is commonly provided with a generally rectangular cover. The cover also comprises the cover or door for an airbag deployment opening that is formed in a portion of the instrument panel.

Automotive vehicles provided with inflatable airbag cushion safety restraint devices have commonly been designed with a stationary panel, located on a downward and forwardly inclined portion of the instrument panel, which panel acts as a knee crush zone. The portion of the instrument panel enclosed in the knee crush zone is oftentimes classified or referred to as a "knee bolster." During a crash, momentum may cause the occupant to move forward and such that the legs of the occupant contact the knee bolster. As a result, such knee bolsters can desirably prevent the occupant from submarining beneath the inflated airbag. With such contact, the knee bolster may desirably deform under the load, absorbing energy and minimizing the forces acting on the legs of the occupant.

The use of a crushable stationary panel on the instrument panel of an automotive vehicle to provide a knee crush zone or bolster can be disadvantageous in a number of respects. For example, such a construction can serve to reduce the distance between the knees of an occupant and the instrument panel. Such a reduction may detract from and diminish the amount of leg room and the feeling of roominess the occupant would prefer to retain.

As a result, there has been a need and a demand for improved knee bolster assemblies.

At least partially in response to such need, airbag activated knee bolsters such as disclosed in commonly assigned Lang et al., U.S. Pat. No. 5,536,043, issued Jul. 16, 1996, and which patent disclosure is fully incorporated herein by reference, have been developed.

At least certain prior art inflatable knee bolster assemblies utilize retainer rings and a plurality of fasteners such as in the form of nuts, bolts or the like to attach the inflatable knee bolster cushion to either or both the associated knee bolster assembly module housing and the associated knee bolster panel or associated load distributor panel.

Figure 1:
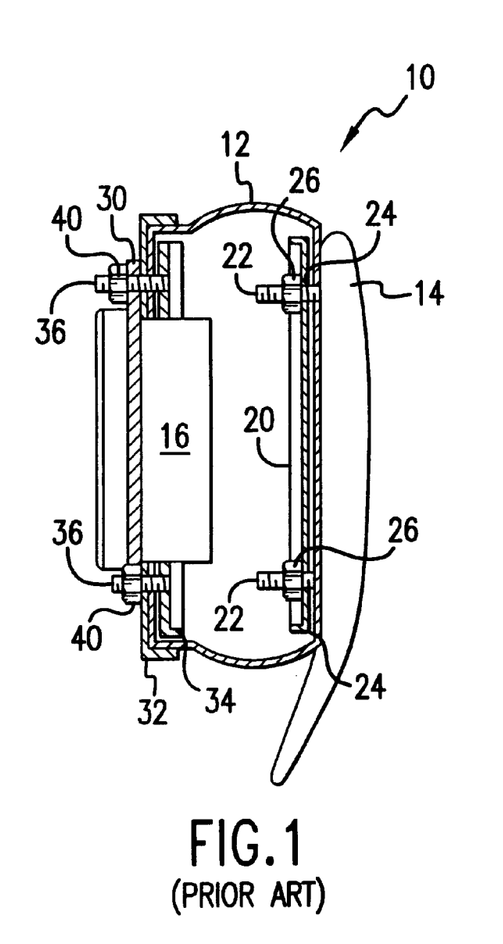
FIG. 1 is a schematic view, partially in section, of an inflatable knee bolster module assembly in accordance with one prior art embodiment.

FIG. 1 illustrates a prior art knee bolster assembly, generally designated by the reference numeral 10 involving the attachment of a knee bag cushion 12 with an associated bolster panel 14 and an associated inflator 16, respectively.

With respect to the attachment of the knee bag cushion 12 with the bolster panel 14, the cushion 12 is secured between the bolster panel 14 and an associated bolster-side retainer plate or ring 20. In particular, the bolster panel 14 is provided with studs 22 which extend through the cushion 12 and through clearance holes 24 provided in the bolster-side retainer plate 20. Attachment nuts 26 are applied to the bolster panel studs 22, thereby clamping the cushion 12 between the bolster panel 14 and the bolster-side retainer ring 20.

With respect to the attachment of the knee bag cushion 12 with the inflator 16, the inflator 16 includes a circumferential attachment flange 30 to which is applied an annular reaction housing 32, also sometimes referred to as a "reaction plate." The cushion 12 is secured between the reaction plate 32 and an associated inflator-side retainer plate or ring 34 by means of studs 36 or the like, such as is known in the art and such as may extend from the retainer ring 34. For example, the rivets 36 can be sequentially passed through the cushion 12, the reaction plate 32 and the inflator attachment flange 30 and then secured with associated attachment nuts 40.

As will be appreciated, such attachment operations may be more difficult than desired as, for example, the bolster panel retainer plate 20 and the associated attachment nuts 26 are inside the cushion 12 and access to this interior region is through the relatively small inflator opening to the cushion. Further, the use of such multiple part fastening systems can be more complicated and costly than desired for efficient mass production.

Figure 2:
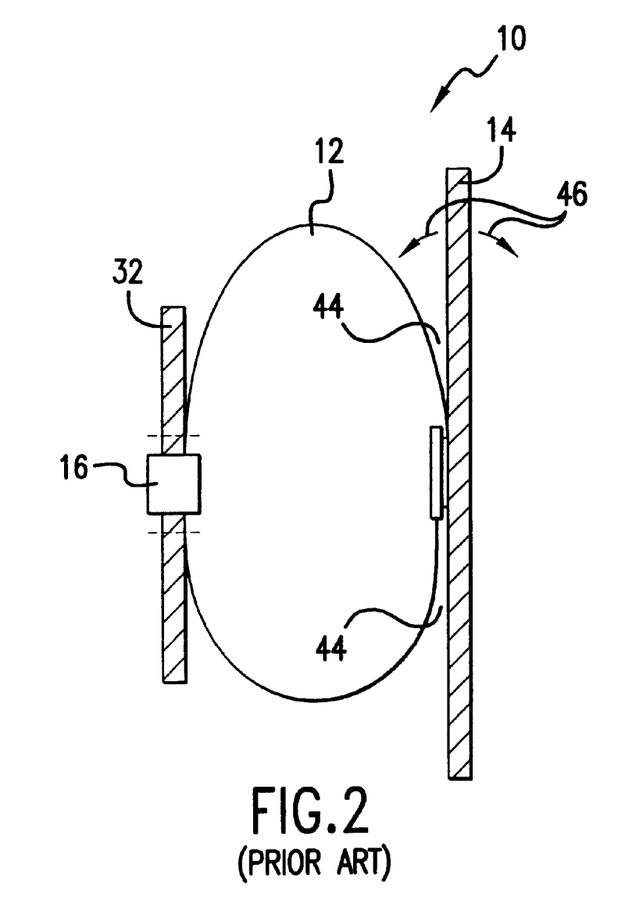
FIG. 2 is a schematic of the inflatable knee bolster module assembly shown in FIG. 1 in a deployed state or condition.

FIG. 2 illustrates the assembly 10 of FIG. 1 after inflation of the cushion 12. As shown in FIG. 2, upon inflation of the cushion 12, large, generally triangular shaped voids 44 can occur or be formed between the cushion 12 and the bolster panel 14. As observed in previous tests, such an assembly can cause or result in undesired rotation of the bolster panel 14 relative to the retainer 20, for example, as signified by the arrows 46. As a result, the assembly 10 may experience or exhibit greater than desired instability.

The above-identified related application, now Schneider, U.S. Pat. No. 5,630,621, discloses a knee bolster assembly which advantageously overcomes at least some of the shortcomings or limitations of such earlier knee bolster assembly designs. The above-identified related application discloses a knee bolster assembly which advantageously eliminates the need for a bolster-side retainer and associated fasteners for attaching a bolster cushion to an associated bolster panel. In particular, it discloses attaching a bolster cushion to an associated bolster panel via the use of a rod and channel design. Further, as disclosed, such a knee bolster assembly can advantageously prevent the creation of undesirable voids which reduce assembly stability.

Certain limitations may, however, prevent or restrict the more widespread use of such knee bolster assemblies. For example, though such channels can generally be conveniently and economically formed via continuous extrusion processing, such processing generally necessitates that the channels have a continuous cross sectional form. As a result, contoured or other sweeping surface panel forms, such as may be desired to more closely fit or match vehicle interior trim sections may not be possible when using such extrusion processing. Also, a retainer ring and associated fasteners are employed to ensure a proper seal of the bolster cushion with the module housing, e.g., the reaction plate.

Thus, there is a continuing need and demand for further improved inflatable knee bolster module assembly and associated methods. In particular, there is a need and a demand for improved inflatable knee bolster module assemblies such that facilitate assembly and construction and such as may for readily permit contoured or other sweeping surface panel forms. Further, there is a need and a demand for such module assemblies and associated methods which are useful and effective in simplifying construction and assembly of associated inflatable knee cushions and reaction housings.

SUMMARY OF THE INVENTION

A general object of the invention is to provide an improved inflatable knee bolster module assembly and associated methods.

A more specific objective of the invention is to overcome one or more of the problems described above.

The general object of the invention can be attained, at least in part, in accordance with one preferred embodiment of the invention, through an inflatable knee bolster module assembly which includes an inflatable knee cushion having opposed first and second outer lateral sides. At least the first outer lateral side of the inflatable knee cushion includes at least first and second longitudinally spaced apart attachment extensions. The module assembly also includes a reaction housing joined with one of the first and second outer lateral sides of the inflatable knee cushion. The assembly also includes a load distributor panel joined with the other of the first and second outer lateral sides of the inflatable knee cushion. In accordance with such embodiment, the one of the reaction housing and the load distributor panel joined with the first outer lateral side includes at least first and second longitudinally spaced apart attachment openings respectively corresponding to the first and second longitudinally spaced apart attachment extensions of the inflatable knee cushion. In the module assembly, the first attachment extension extends through the first attachment opening in secured relationship and the second attachment extension extends through the second attachment opening in secured relationship.

In one particular form of such a module assembly, at least the first longitudinally spaced apart attachment extension of the inflatable knee cushion is in the form of a material loop and the module assembly additionally includes a retention rod extendable through the material loop attachment extension to prevent withdrawal of the material loop attachment extension through the first attachment opening.

In another particular form of such a module assembly, at least the first longitudinally spaced apart attachment extension of the inflatable knee cushion forms a slot and the at least the one of the reaction housing and the load distributor panel joined with the first outer lateral side additionally includes an attachment projection extending therefrom in a direction opposite the inflatable knee cushion, with the attachment projection extendable through the attachment extension slot.

The prior art generally fails to provide inflatable knee bolster module assemblies and associated methods such that facilitate assembly and construction to an extent as great as generally desired. Further, the prior art generally fails to provide inflatable knee bolster module assemblies and associated methods which as readily permit or are otherwise conducive to use with or in conjunction with contoured or other sweeping surface panel forms such as may be desired to provide a better match or fit with the vehicle interior trim. Still further, the prior art generally fails to provide module assemblies and associated methods which are as useful and effective as desired in simplifying construction and assembly of associated inflatable knee cushions and reaction housings.

The invention further comprehends an improvement in an inflatable knee bolster module assembly which includes an inflatable knee cushion having opposed first and second outer lateral sides, a first panel member comprising a reaction housing panel and a second panel member comprising a load distributor panel. In accordance with one particular embodiment of the invention, the improvement includes at least the first outer lateral side of the inflatable knee cushion having at least first and second longitudinally spaced apart attachment extensions. The improvement also includes at least one of the first and second panel members having at least first and second longitudinally spaced apart attachment openings respectively corresponding to the first and second longitudinally spaced apart attachment extension of the inflatable knee cushion with the first attachment extension extending through the first attachment opening in secured relationship and the second attachment extension extending through the second attachment opening in secured relationship.

The invention still further comprehends a method for attaching an inflatable knee cushion with at least one panel member selected from the group of a reaction housing panel and a load distributor panel in an inflatable knee bolster module assembly. The method involves passing first and second longitudinally spaced apart attachment extensions of a first outer lateral side of the inflatable knee cushion through, respectively corresponding first and second attachment openings in the at least one panel member, in secured relationship.

Other objects and advantages will be apparent to those skilled in the art from the following detailed description taken in conjunction with the appended claims and drawings.

DETAILED DESCRIPTION OF THE INVENTION

The present invention, as is described in more detail below, provides an improved inflatable knee bolster module assembly and associated methods. The present invention may be embodied in a variety of different structures. As representative, FIG. 3 illustrates an inflatable knee bolster module assembly, generally designated by the reference numeral 100, in accordance with one preferred embodiment of the invention.

Figure 3:
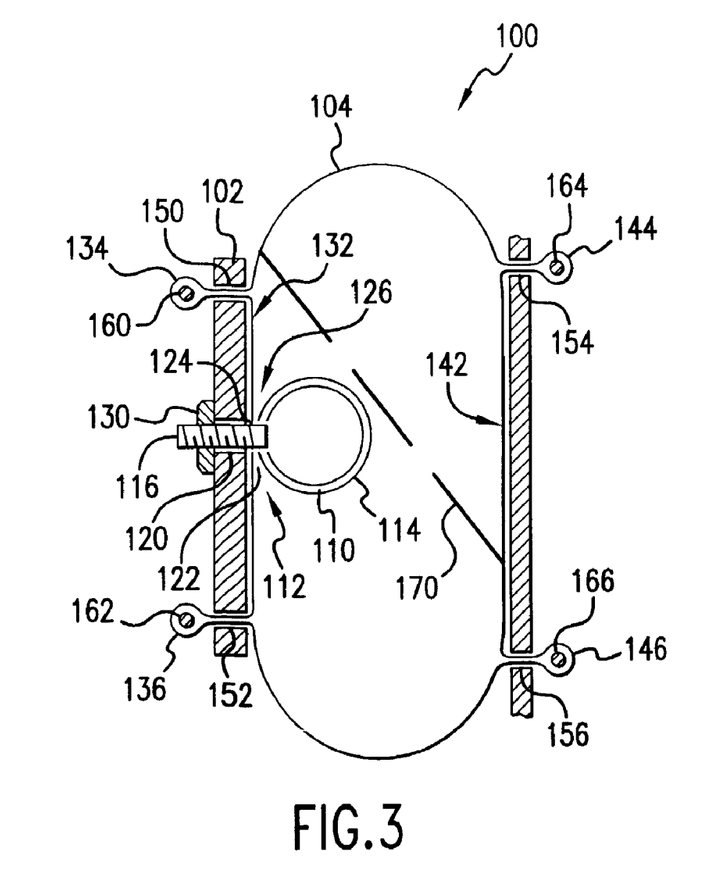
FIG. 3 is a fragmentary schematic view, partially in section, of an inflatable knee bolster module assembly in accordance with one preferred embodiment of the invention.

The inflatable knee bolster module assembly 100 includes a reaction housing or plate 102, an inflatable knee cushion 104, and a load distributor panel 106 (only a fragmentary portion of the load distributor panel 106 is shown in FIG. 3). The reaction housing 102 can, as shown, form a base for attachment of an associated inflator device 110. More particularly, the module assembly 100 also includes an attachment combination 112 such as composed of a generally tubular housing 114 wherein the inflator device 110 is housed or contained. The attachment combination 112 further includes an attachment stud 116 extending from the tubular housing 114 and passing through an associated attachment aperture 120 formed in the reaction housing 102. The attachment stud 116 also passes through apertures 122 and 124, formed in an overlapping throat region 126 of the inflatable knee cushion 104, such as to secure the inflatable knee cushion throat region 126 between the tubular housing 114 and the reaction housing 102, such as in a manner known in the art. As shown, an external attachment nut 130 is applied to the stud 116 such as to desirably secure the attachment combination 112 with the reaction housing 102.

In the module assembly 100, the inflator device 110 has a generally elongated cylindrical shape, such as is common for inflator devices employed in automotive vehicle passenger inflatable restraint systems. It is to be understood, however, that the broader practice of the invention is not limited to the specific form, construction or mode of operation of the associated inflator device and thus inflator devices of various forms, constructions and modes of operation, such as known in the art, can be used in the practice of the invention and are encompassed herein.

Further, it is to be appreciated that the reaction housing 102 can be variously shaped or formed such as in the shape of a planar plate or a wide, shallow, pan-shaped vessel, for example, as is known in the art and such as may serve as a container or housing for either or both the inflatable knee cushion 104 and the associated inflator device 110.

The inflatable knee cushion 104 includes or forms an outer lateral side 132 adjacent the reaction housing 102. The cushion outer lateral side 132 forms or includes a pair of longitudinally spaced apart attachment extensions 134 and 136, respectively. The inflatable knee cushion 104 similarly also includes or forms an outer lateral side 142 generally adjacent the load distributor panel and oppositely positioned relative to the cushion outer lateral side 132. The cushion outer lateral side 142 similarly forms or includes a pair of longitudinally spaced apart attachment extensions 144 and 146, respectively.

As described in greater detail below, the attachment extensions 134 and 136 serve to join the cushion outer lateral side 132 with the reaction housing 102 while the attachment extensions 144 and 146 serve to join the cushion outer lateral side 142 with the load distributor panel 106. More specifically, the reaction housing 102 includes longitudinally spaced apart attachment openings 150 and 152 generally corresponding to associated attachment extensions 134 and 136, respectively. Similarly, the load distributor panel 106 includes longitudinally spaced apart attachment openings 154 and 156 generally corresponding to associated attachment extensions 144 and 146, respectively.

As described in greater detail below, the attachment extensions 134, 136, 144 and 146 each house or contain a corresponding retention rod, individually respectively designated by the reference numerals 160, 162, 164 and 166.

Also, as described in greater detail below, the inflatable knee cushion 104 also includes a panel form of tether 170 such as can desirably serve to control or otherwise assist in insuring proper or desired placement or positioning of either or both the knee cushion 104 and associated knee bolster, upon activation of the assembly 100 and deployment of the inflatable knee cushion 104 therefrom.

Figure 4:
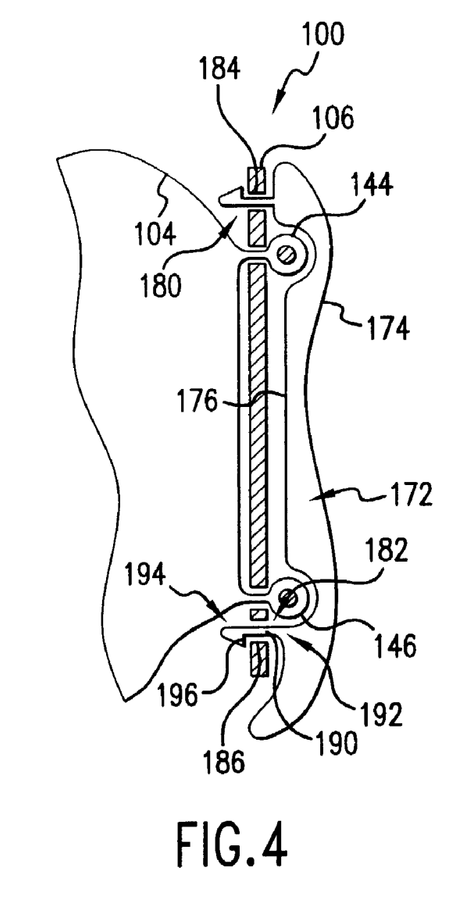
FIG. 4 is a fragmentary schematic view, partially in section, of an inflatable knee bolster module assembly in accordance with one preferred embodiment of the invention and including an attachable bolster panel.

Turning now to FIG. 4, there is illustrated is a fragmentary schematic view of the inflatable knee bolster module assembly 100. FIG. 4 illustrates a fragmentary portion of the inflatable knee cushion 104, the entire load distributor panel 106 and the presence or inclusion of an attachable bolster panel 172. Such a bolster panel can be variously constructed or formed, such as is known in the art. For example, such a bolster panel can be made of cast skin and foamed plastic over a solid substrate. The bolster panel 172 includes an outer face 174 such as having a contour designed to match or otherwise fit with the vehicle interior trim whereat the module assembly 100 is to be mounted. The bolster panel 172 also includes an inner face 176 such as designed for general placement adjacent the load distributor panel 106. More specifically, the bolster panel inner face 176 includes a contour formed to accept the associated attachment extensions 144 and 146, respectively. The bolster panel inner face 176 also includes a pair of longitudinally spaced apart attachment projections 180 and 182, respectively. The attachment projections 180 and 182 are adapted to pass through corresponding attachment apertures 184 and 186, respectively, formed in the load distributor panel 106 such as to desirably secure the bolster panel 172 to and with the load distributor panel 106. Various specific structures or forms, such as to prevent undesired detachment of a bolster panel from an associated load distributor panel will be apparent to those skilled in the art and guided by the teachings herein provided. For example, the attachment projections 180 and 182 can each desirably include a projection arm 190, such as having a first end 192 attached or formed in one piece with the bolster panel 172 or a component part thereof, and an opposed second end 194 such as whereat is formed a retention flange 196 such as adapted to pass through an associated attachment aperture in snap-fit attachment. The broader practice of the invention is not, however, necessarily limited to the use of specific attachment features for the attachment of a bolster panel to or with an associated load distributor panel.

Further, while the invention has been described above relative to a module assembly having a bolster panel in the form of a separate attachable element or component, those skilled in the art and guided by the teachings herein provided will appreciate that the broader practice of the invention is not necessarily so limited and that various modifications or combination can desirably be employed. For example, the invention can, if desired, be practiced employing a module assembly wherein the bolster panel is formed in one piece with the associated load distributor panel.

Figure 5:
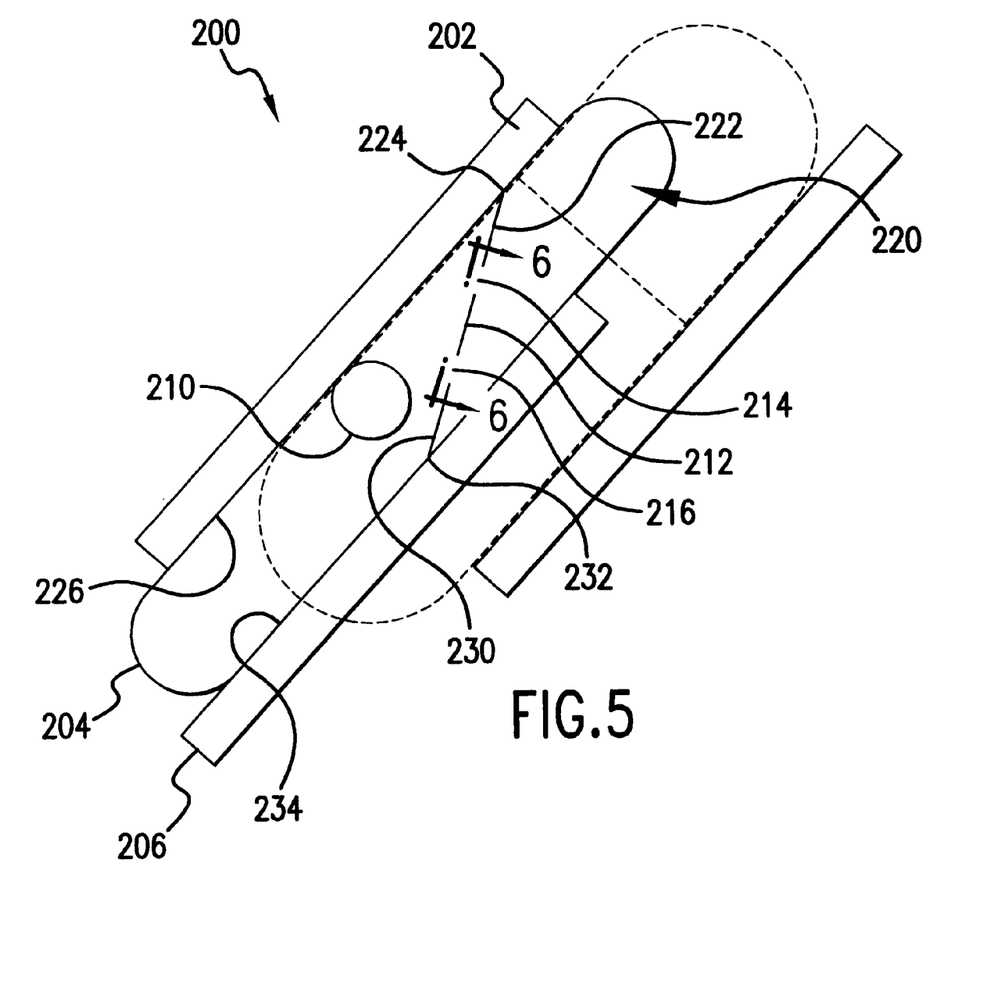
FIG. 5 is a simplified schematic of the deployment process for the inflatable knee bolster module assembly shown in FIG. 3.

Turning now to FIG. 5, there is illustrated a simplified schematic of an inflatable knee bolster module assembly, generally designated by the reference numeral 200, and illustrating the deployment process relative thereto in accordance with one embodiment of the invention. More specifically, the inflatable knee bolster module assembly 200 is generally similar to the inflatable knee bolster module assembly 100 described above and includes common components such as a reaction housing 202, an inflatable knee cushion 204, a load distributor panel 206 and an inflator 210. To facilitate illustration and comprehension of the deployment process, the module assembly 200 has been shown in FIG. 5 in a simplified form by not showing various of the specific features involved in joining such component parts and such as more specifically described above and further described below. For example, with respect to the module assembly 200, it is to be understood that the inflator 210 can be attached or joined therein in a manner such as described above relative to the inflator 110 of the module assembly 100. Similarly, the reaction housing 202, the inflatable knee cushion 204, and the load distributor panel 206 can be joined within the assembly 200 in similar manners as the corresponding components in the above-described module assembly 100. Further, the inflatable knee cushion 204, similar to the inflatable knee cushion 104 identified above includes an interior tether 212 such as in the form of a panel.

Upon activation of the assembly 200, the inflatable knee cushion 204 desirably assumes the shape and form shown in dashed outline in FIG. 5. In particular, the inflating knee cushion 204 creates or otherwise exerts a pressure acting on the load distributor panel 206 such as to further space the load distributor panel 206 from the reaction housing 202 and in a direction generally toward an oppositely situated occupant (not shown). As will be appreciated, the inflated knee cushion 204 is desirably placed to resist compressive forces such as may result with occupant contact with the assembly 200, such as in the event of a collision involving a vehicle wherein the assembly 200 has been placed.

As will be appreciated by those skilled in the art and guided by the teachings herein provided, one or more tethers can be included within knee bag cushions employed in the practice of the invention such as to desirably limit or otherwise control or direct the movement of the knee bag cushion upon deployment and in response to compressive forces such as may be applied thereagainst such as in the event of a collision involving a vehicle wherein the assembly has been placed.

Figure 6:
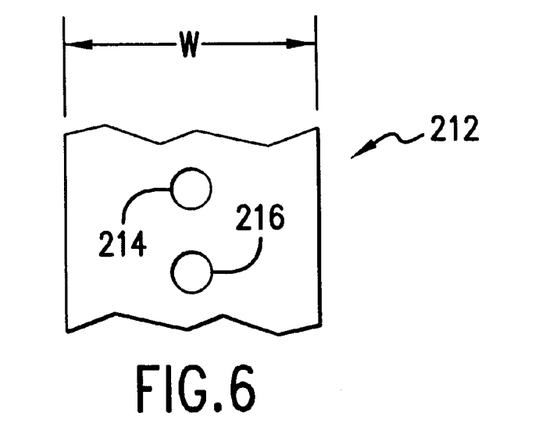
FIG. 6 a simplified schematic of the tether of the inflatable knee bolster module assembly shown in FIG. 3, taken substantially along the line 6—6 of FIG. 5 and viewed in the direction of the arrows.

The tether 212 is illustrated in greater detail in FIG. 6. The tether 212 may desirably be constructed or formed of the same or similar material as of which the inflatable knee cushion is formed. Alternatively, the tether may be constructed or formed from other suitable materials such as known in the art.

As shown, the tether 212 desirably is in the form of a panel such as constituting a width ("w") of about seven (7) to eight (8) inches. The panel tether 212 may further include one or more vent holes 214 and 216 therethrough, as shown.

Returning to FIG. 5, it can be seen that through the inclusion of the vent holes 214 and 216 in the tether 212, passage of an inflation medium from the inflator 210 into an upper portion of the inflatable knee cushion 204 and which upper cushion portion is designated by the reference numeral 220 is more freely permitted. The panel tether 212 also includes an upper end 222 attached or joined, such as via stitching or the like, to an upper side area, designated by the reference numeral 224, of a reaction housing-adjacent lateral side 226 of the inflatable knee cushion 204. The panel tether 212 also includes a lower end 230 such as similarly attached or joined to a lower side area, designated by the reference numeral 232, of a load distributor panel-adjacent lateral side 234 of the inflatable knee cushion 204.

Such a panel form of tether is to be contrasted with conventional airbag cushion tethers which commonly take the form of relatively narrow, e.g., having a width of about one (1) inch, strips of material and which do not include vent holes or the like. In particular, such panel form of a tether can, at least in certain particular embodiments, serve to more effectively desirably limit or otherwise control or direct the movement of an associated knee bag cushion upon deployment and in response to compressive forces such as may be applied thereagainst such as in the event of a collision involving a vehicle wherein the assembly has been placed.

Those skilled in the art and guided by the teachings herein provided will appreciate that panel members, such as in the form of either a reaction housing or a load distributor panel as identified above, can include attachment openings of various forms or shapes such as to facilitate desired attachment in accordance with the invention.

Figure 7:
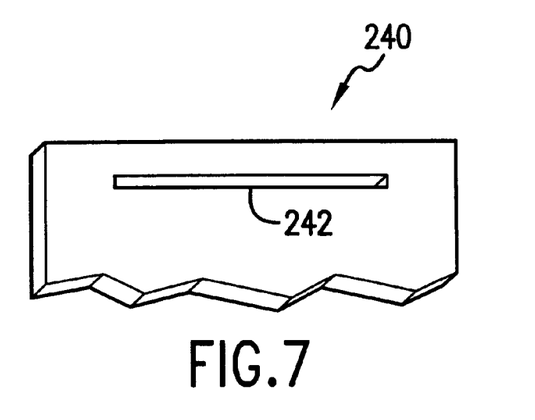
FIG. 7 is a simplified fragmentary perspective schematic of a panel member in accordance with one embodiment of the invention.
Figure 8:
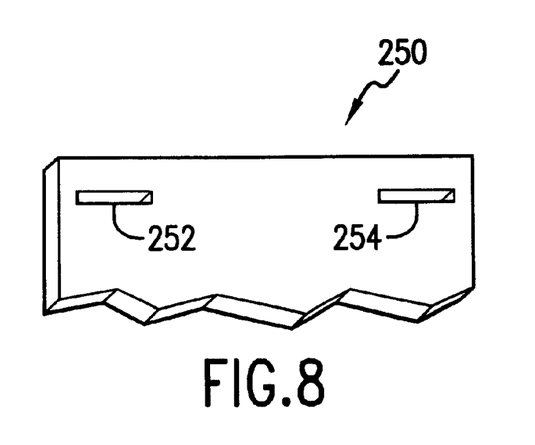
FIG. 8 is a simplified fragmentary perspective schematic of a panel member in accordance with an alternative embodiment of the invention.

For example, FIG. 7 illustrates a simplified fragmentary schematic view of a panel member 240 in accordance with one preferred embodiment of the invention. More specifically, the panel member 240 forms or otherwise includes an attachment opening 242 in the general form of a narrow slot extending across the width of the panel member. FIG. 8 illustrates a simplified fragmentary schematic view of a panel member 250, in accordance with an alternative embodiment of the invention. More particularly, the panel member 250 includes a pair of laterally spaced apart attachment openings 252 and 254, respectively. Each of the attachment openings 252 and 254 is in the general form of a narrow slot extending across a portion of the width of the panel member.

It will be understood that assembly panel members such as in the form of a reaction housing or a load distributor panel, such as described above, will preferably include at least two longitudinally spaced apart attachment openings as discussed above relative to the assembly 100 shown in FIG. 3. In particular, the inclusion of at least two longitudinally spaced apart attachment openings generally more practically results or forms appropriately stable inflatable knee bolster module assemblies. Thus, it is to be appreciated that the fragmentary views of the panel members 240 and 250 shown in FIGS. 7 and 8 generally only illustrate one of two or more longitudinally spaced apart attachment opening included in each respective panel member.

Figure 9:
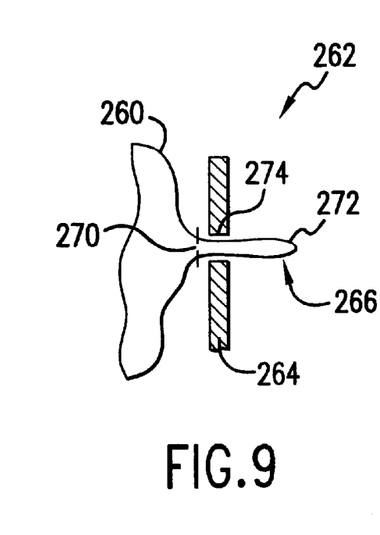
FIGS. 9–11 are simplified fragmentary schematics illustrating an installation sequence for the attaching of the inflatable knee bolster cushion of the module assembly of FIG. 3 with an associated panel member, in accordance with one embodiment of the invention.
Figure 10:
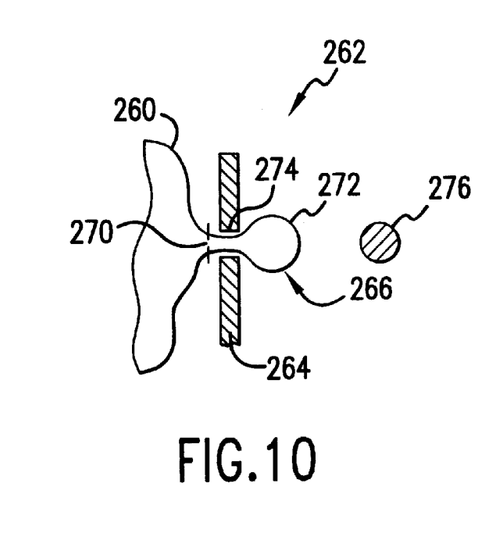
Figure 11:
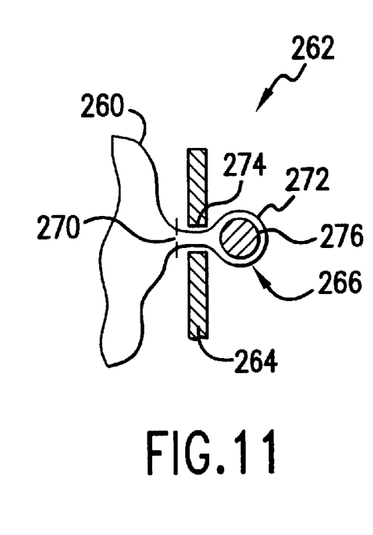

Turning now to FIGS. 9–11, there are shown simplified fragmentary schematics illustrating an installation sequence for the attaching of an inflatable knee bolster cushion 260 of a module assembly 262 with an associated panel member 264, and such as generally representing either a reaction housing or a load distributor panel, such as shown in FIG. 3.

As shown in FIG. 9, the inflatable knee bolster cushion 260 includes an attachment extension 266 such as formed by doubling the cushion material upon itself and having one or more stitches 270 such as to form an attachment extension loop 272. The attachment extension loop 272 is passed through a corresponding attachment opening 274 formed or included in the panel member 264. As shown, the attachment extension loop 272 can desirably be flattened such as to facilitate passage thereof through the corresponding attachment opening 274.

As shown in FIG. 10, the attachment extension loop 272 can be appropriately widened or otherwise arranged such as to facilitate acceptance, extension or passage of an associated retention rod 276 therethrough.

FIG. 11 illustrates the final arrangement of the attachment extension loop 272 with the retention rod 276 passed therethrough such as to secure the inflatable knee bolster cushion 260 with the panel member 264. As a result of the retention rod 276 having a diameter appropriately sized relative to the thickness of the attachment opening 274, such an arrangement will generally prevent or avoid the undesired separation of the inflatable knee bolster cushion 260 from the panel member 264.

Figure 12:
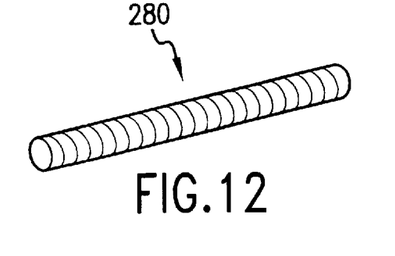
FIG. 12 is a simplified perspective view of a retention rod, in accordance with one preferred embodiment of the invention, for use in an inflatable knee bolster module assembly such as shown in FIG. 3.

FIG. 12 illustrates a retention rod 280 in accordance with one preferred embodiment of the invention and such as for use in the inflatable knee bolster module assembly 100, as shown in FIG. 3. The retention rod 280 is generally in the shape of an elongated cylinder and such as constructed or formed of nylon or other appropriate material such as may desirably allow or permit the retention rod to desirably conform to a suitably contoured surface as may be present or occur in an associated panel member, such as a reaction housing or a load distributor panel, for example.

Figure 13:
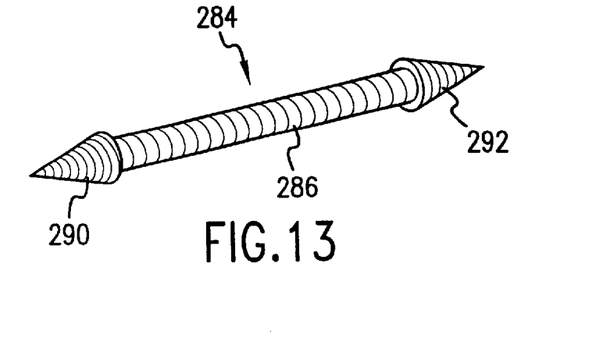
FIG. 13 is a simplified perspective view of a retention rod, in accordance with an alternative preferred embodiment of the invention, for use in an inflatable knee bolster module assembly such as shown in FIG. 3.

FIG. 13 illustrates a retention rod 284 in accordance with an alternative preferred embodiment of the invention. The retention rod 284, similar to the retention rod 280 described above, is generally suitable for use in the inflatable knee bolster module assembly 100, as shown in FIG. 3. The retention rod 284 includes a body portion 286 having the general shape of an elongated cylinder, similar to the retention rod 280. The retention rod 284, however, also includes first and second retention features 290 and 292, respectively, extending from opposed ends of the retention rod body portion 286 and such as may be useful in assuring proper retention of the rod within an associated inflatable knee cushion attachment extension. In the illustrated embodiment, retention features 290 and 292 such as having a branched form sometimes referred to as a "Christmas tree" are shown. It is to be understood, however, that suitable retention features for use in the practice of the invention can be variously sized and shaped as may be desired for particular module assembly constructions.

While retention rods in accordance with particular preferred embodiments are shown in FIGS. 12 and 13, retention rods of various sizes, shapes and/or constructions can be used in the practice of the invention and thus the broader practice of the invention is not to be necessarily construed as limited to the use of specifically designed retention rods.

Figure 14:
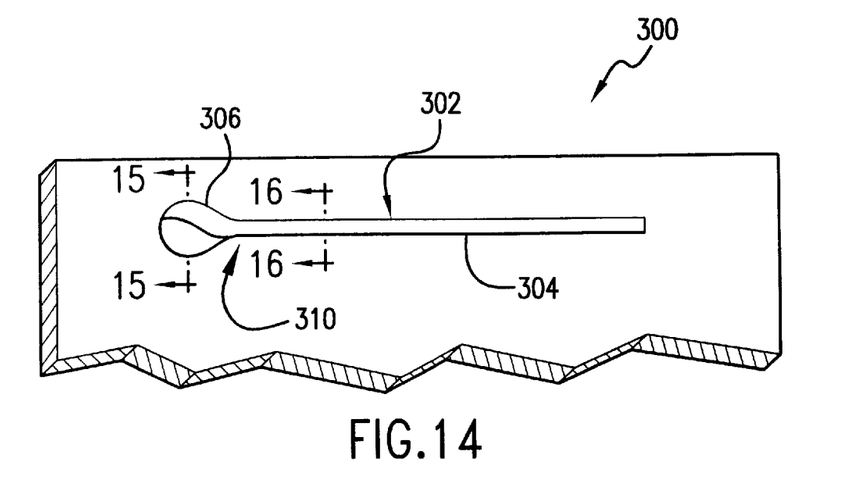
FIG. 14 is a simplified fragmentary perspective schematic of a panel member in accordance with an alternative embodiment of the invention.

While the invention has been described above relative to the use of panel members having cushion extension attachment openings of uniform shape or form, it is to be understood that the invention is not necessarily so limited. For example, FIG. 14 illustrates a panel member 300 having an attachment opening 302 in one appropriate non-uniform shape or form, in accordance with an alternative embodiment of the invention. In particular, the panel member 300, such as in the form of a reaction housing or a load distributor panel as identified above, and for which panel member the attachment opening 302 is generally in the form of a keyed slot having a narrow slot portion 304 extending across a portion of the width of the panel member 300 and having a thickened slot opening portion 306 such as at an end 310 of the narrow slot portion 304.

Figure 15:
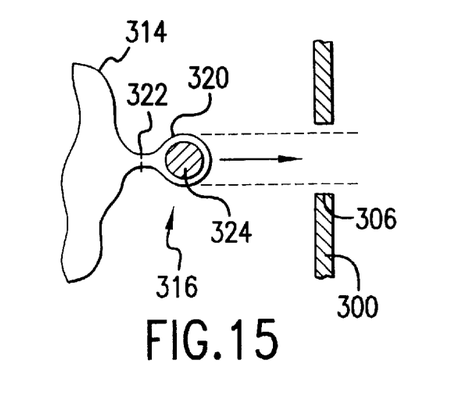
FIG. 15 is a simplified fragmentary schematic illustrating an installation process for attaching an inflatable knee bolster cushion in a module assembly in accordance with yet another preferred embodiment of the invention utilizing the panel member shown in FIG. 14, with such panel member viewed substantially along the line 15—15 of FIG. 14 and in the direction of the arrows.
Figure 16:
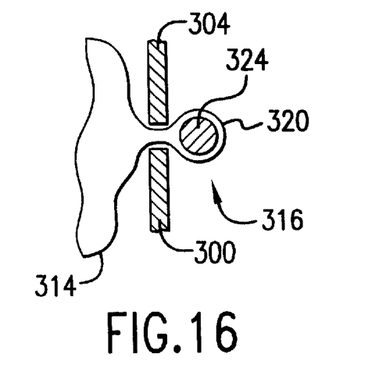
FIG. 16 is a simplified fragmentary schematic illustrating the module assembly shown in FIG. 15 with the knee bolster cushion joined therein and viewed substantially along the line 16—16 of FIG. 14 and in the direction of the arrows.

As shown in FIGS. 15 and 16 and described below, the use of such a keyed slot can advantageously permit or more easily allow the use of attachment extensions, such as shown in FIG. 3 and described above such as having the form of a stitched together material loop. In particular, the use of such a keyed slot with a thickened slot opening portion 306, such as extending from at least one end of a narrow slot, may permit the use of constructions wherein suitable retention rods have been inserted within a corresponding material loop prior to passage of the material loop through the attachment opening.

More specifically, FIG. 15 illustrates an inflatable knee cushion 314 with an attachment extension 316. The attachment extension 316 is in the form of a cushion material loop 320 with stitches 322. Within the loop 320 there is contained a suitable retention rod 324, such as described above. The attachment extension 316, with the retention rod 324 therein, is passed through the thickened slot opening portion 306 of the panel member 300. With such a construction, the retention rod 324 can, if desired, be simply sewn in place such as by placing the retention rod 324 relative to the inflatable knee cushion material and then adding the stitches 322 such as to form the attachment extension loop 320 thereabout. As will be appreciated, the use of an appropriately thickened slot opening portion 306 facilitates the desired passage of the rod-containing attachment extension 316 through the panel member 300 as, for example, such a rod-containing attachment extension can be passed through the thickened slot opening portion 306 in a manner wherein such an elongated retention rod extends substantially perpendicular to the panel member 300 as the rod-containing attachment extension is passed through the slot opening portion 306.

As shown in FIG. 16, after the rod-containing attachment extension 316 has been passed through the thickened slot opening portion 306 of the panel member 300, the rod-containing attachment extension 316 can be desirably positioned adjacent the narrow slot portion 304 of the attachment opening 302. In this way, undesired withdrawal or detachment of the inflatable knee cushion 314 from the panel member 300 can be prevented, while permitting the manufacturing and production capability and flexibility of the use of an inflatable knee cushion with the retention rods sewn therein.

Figures 17, 18:
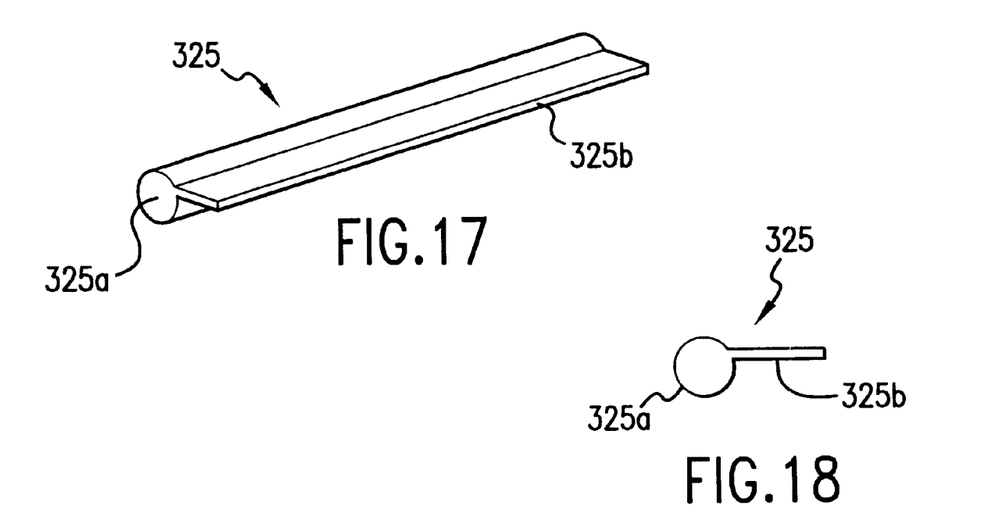
FIG. 17 is a simplified perspective view of a retention rod, in accordance with yet another alternative preferred embodiment of the invention
FIG. 18 is a simplified end view of the retention rod shown in FIG. 17.

An alternative preferred embodiment of the invention such as also permits the use of an inflatable knee cushion with the retention rods secured therein will now be described making reference to FIGS. 17–19. More particularly, FIGS. 17 and 18 illustrate a retention rod 325 composed of an elongated cylindrical portion 325a, similar to the retention rod 280 described above, and also having a substantially flat flange portion 325b such as extending along at least a portion of the length thereof. The retention rod 325, similar to the retention rod 280 described above, can be constructed or formed of nylon or other appropriate material such as may desirably allow or permit the retention rod to desirably conform to a suitably contoured surface as may be present or occur in an associated panel member, such as a reaction housing or a load distributor panel, for example.

Figure 19:
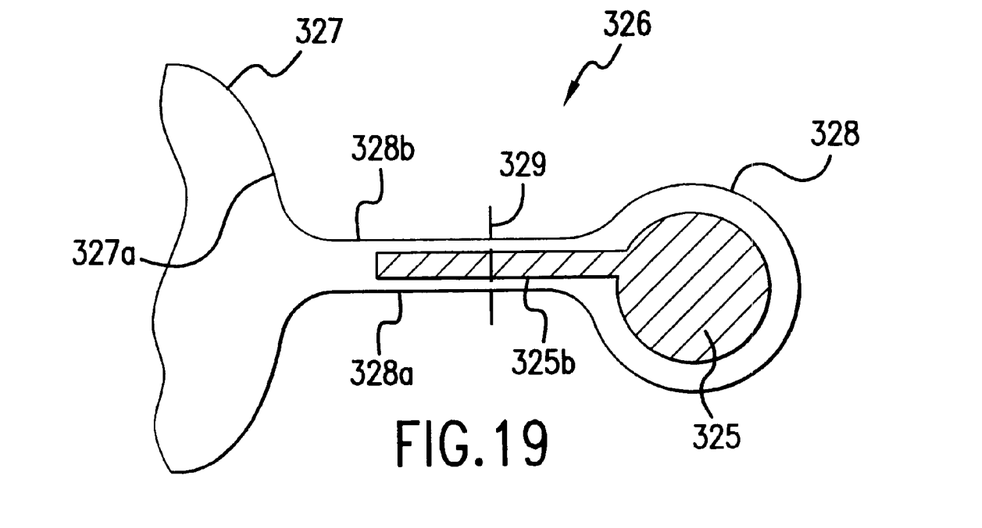
FIG. 19 is a simplified cross sectional view of an airbag cushion attachment extension wherein the retention rod shown in FIGS. 17 and 18 has been sewn therein.

Turning to FIG. 19, there is illustrated a retention rod-containing cushion attachment extension 326 formed in an inflatable knee cushion 327, formed of a cushion material 327a. While such an attachment extension can be variously formed or constructed, in accordance with one preferred embodiment of the invention, the attachment extension 326 is simply and desirably formed by placing the retention rod 325 adjacent the cushion material 327a. Then, folding or otherwise forming a suitable cushion material loop 328 therearound and such as to secure the retention rod 325 to or with the inflatable knee cushion 327. For example, opposite sides of the cushion material loop 328, such opposite sides individually designated 328a and 328b, respectively, can be stitched together such as directly through the retention rod flange portion 325b via the stitches 329.

As will be appreciated by those skilled in the art and guided by the teachings herein provided, such an attachment extension construction can afford various production and/or processing advantages. For example, such a construction can be used to better ensure the exact position or placement of the retention rod in the final construction. Further, such a construction can facilitate final assembly by avoiding the need to handle and install a retention rod in an attachment extension material loop as a final or later step in the assembly process.

Those skilled in the art and guided by the teachings herein provided will appreciate that attachment extensions, such as used to join together inflatable knee cushion and associated panel members in accordance with the invention can be variously constructed or formed. For example, FIGS. 20 and 21 an inflatable knee bolster module assembly 330 in accordance with one such alternative preferred embodiment of the invention.

Figure 20:
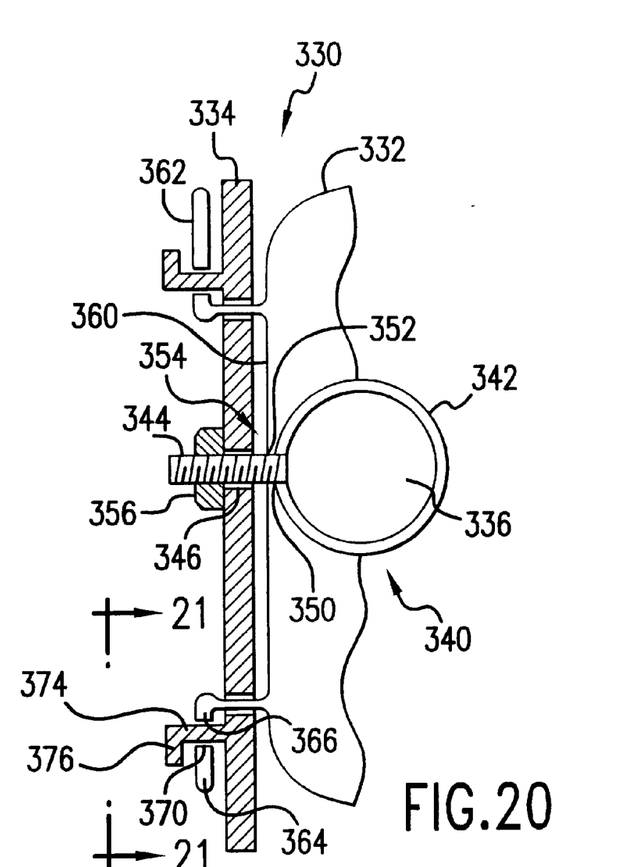
FIG. 20 is a simplified, partially in section, fragmentary schematic of an inflatable knee bolster module assembly in accordance with an alternative preferred embodiment of the invention.

The inflatable knee bolster module assembly 330, similar to module assembly embodiments described above, includes an inflatable knee cushion 332 and a panel member 334, here in the form of a reaction housing or plate. The reaction housing panel member 334, similar to the reaction housing 102 described above, forms a base for attachment of a corresponding associated inflator device 336. More particularly, the module assembly 330 also includes an attachment combination 340 such as described above and which attachment combination includes a tubular housing 342 housing or containing the inflator device 336. The attachment combination 340 also includes an attachment stud 344 extending from the tubular housing 342 and passing through an associated attachment aperture 346 formed in the reaction housing panel member 334. The attachment stud 344 also passes through apertures 350 and 352 formed in an overlapping throat region 354 of the inflatable knee cushion 332 such as to secure the inflatable knee cushion throat region 354 between the attachment combination tubular housing 342 and the reaction housing panel member 334, such as in a manner known in the art. As shown, an external attachment nut 356 is applied to the stud 344 such as to desirably secure the attachment combination 340 with the reaction housing panel member 334.

Figure 21:
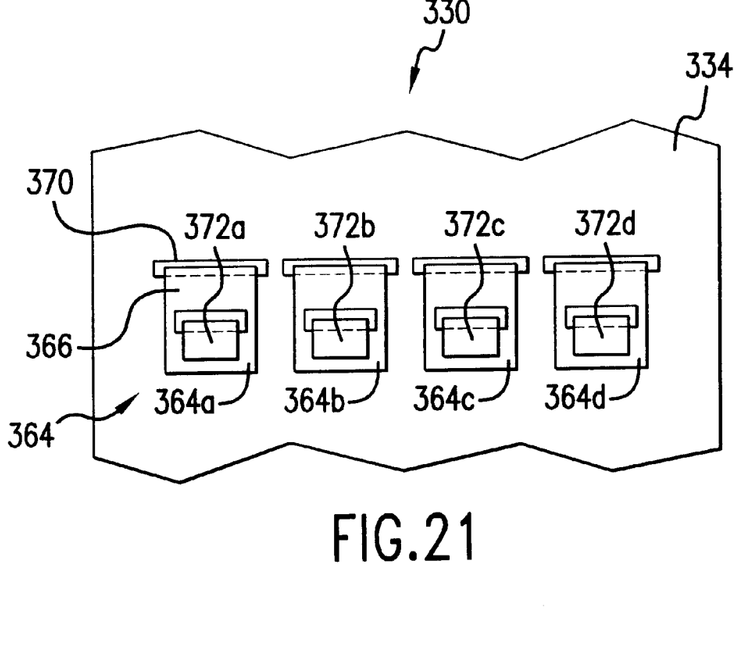
FIG. 21 is a simplified schematic of the inflatable knee bolster module assembly shown in FIG. 20 taken substantially along the line 21—21 of FIG. 20 and viewed in the direction of the arrows.

The inflatable knee cushion 332 includes or forms an outer lateral side 360 adjacent the reaction housing panel member 334. The cushion outer lateral side 360 forms or includes longitudinally spaced apart attachment extensions 362 and 364, respectively. As shown in FIG. 21, the attachment extension 364 includes, forms or otherwise constitutes a series of laterally spaced apart attachment extensions, individually designated 364a, 364b, 364c and 364d, respectively. The individual attachment extensions 364(a–d) are each in the general form of a stitched together loop 366 of cushion material and which loop 366 contains, forms or otherwise includes a respective slot opening 370.

The reaction housing panel member 334 forms or otherwise includes a series of laterally spaced apart attachment projections, individually designated 372a, 372b, 372c and 372d. The attachment projections 372(a–d) extend from the panel member 334 in a direction opposite the inflatable knee cushion 332 and adapted to pass through the slot opening 370 in the corresponding associated cushion attachment extension 364(a–d). The attachment projections 372(a–d) are each of a general form which includes an arm portion 374 and an angled flange end 376 such as may serve to prevent unintended withdrawal of an attachment projection from a corresponding attachment extension. It is to be understood, however, that attachment projections of various suitable constructions or forms can be used in the practice.

While the attachment extension 364 has been shown as including a series of four (4) individual attachment extensions 364(a–d), it is to be understood that a greater or lesser number of individual attachment extensions can be used as may be desired for particular applications. Further, while the embodiment shown and described above relative to FIGS. 20 and 21 makes use of a panel member in the general form of a reaction housing, it will be appreciated that such an embodiment can similarly be employed where the panel member is in the form of a load distributor panel, such as included in such module assemblies.

Thus, the invention provides inflatable knee bolster module assemblies and associated methods such that facilitate assembly and construction. Further, the invention provides inflatable knee bolster module assemblies and associated methods which generally permit or are otherwise conducive to use with or in conjunction with contoured or other sweeping surface panel forms such as may be desired to provide a better match or fit with the vehicle interior trim.

Further, it will be appreciated that either or both a reaction housing panel member and a load distributor panel member may be joined with an associated knee cushion in accordance with the invention.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflatable knee bolster module assembly comprising:
    an inflatable knee cushion having opposed first and second outer lateral sides with at least the first outer lateral side having at least first and second longitudinally spaced apart attachment extensions;
    a reaction housing joined with one of the first and second outer lateral sides of the inflatable knee cushion;
    a load distributor panel joined with the other of the first and second outer lateral sides of the inflatable knee cushion;
    wherein the one of the reaction housing and the load distributor panel joined with the first outer lateral side includes at least first and second longitudinally spaced apart attachment openings respectively corresponding to the first and second longitudinally spaced apart attachment extensions of the inflatable knee cushion with the first attachment extension extending through the first attachment opening in secured relationship and the second attachment extension extending through the second attachment opening in secured relationship, and
    the second outer lateral side of the inflatable knee cushion also includes at least first and second longitudinally spaced apart attachment extensions; and wherein the other of the reaction housing and the load distributor panel joined with the second outer lateral side also has at least first and second longitudinally spaced apart attachment openings respectively corresponding to the first and second longitudinally spaced apart attachment extension of the second outer lateral side, with the first attachment extension of the second outer lateral side extending through the first attachment opening of the other of the reaction housing and the load distributor panel joined with the second outer lateral side in secured relationship and the second attachment extension extending through the second attachment opening of the other of the reaction housing and the load distributor panel joined with the second outer lateral side in secured relationship.

2. The inflatable knee bolster module assembly of claim 1 wherein at least the first longitudinally spaced apart attachment extension of the inflatable knee cushion is in the form of a material loop and wherein the module assembly additionally comprises a retention rod extendable through the material loop attachment extension to prevent withdrawal of the material loop attachment extension through the first attachment opening.

3. The inflatable knee bolster module assembly of claim 2 wherein the retention rod includes at least one retention feature extending therefrom to prevent the unintended withdrawal of the retention rod from the material loop attachment extension.

4. The inflatable knee bolster module assembly of claim 2 wherein the retention rod and the material loop are sewn together.

5. The inflatable knee bolster module assembly of claim 1 wherein the inflatable knee cushion includes at least one internal panel tether.

6. The inflatable knee bolster module assembly of claim 5 wherein the at least one internal panel tether includes at least one vent hole therethrough.

7. The inflatable knee bolster module assembly of claim 1 additionally comprising a bolster panel adjacent the load distributor panel.

8. The inflatable knee bolster module assembly of claim 7 wherein the bolster panel is attachable to the load distributor panel.

9. The inflatable knee bolster module assembly of claim 1 wherein at least one of the first and second longitudinally spaced apart attachment extensions comprises a plurality of individual laterally spaced apart attachment extensions.

10. The inflatable knee bolster module assembly of claim 1 wherein at least the first attachment opening comprises a single slot opening through the one of the reaction housing and the load distributor panel joined with the first outer lateral side.

11. The inflatable knee bolster module assembly of claim 1 wherein at least the first attachment opening comprises at least two laterally spaced apart slot openings through the one of the reaction housing and the load distributor panel joined with the first outer lateral side.

12. The inflatable knee bolster module assembly of claim 1 wherein at least the first attachment opening comprises an opening of non-uniform shape through the one of the reaction housing and the load distributor panel joined with the first outer lateral side.

13. The inflatable knee bolster module assembly of claim 12 wherein the non-uniform shape opening is in the form of a keyed slot comprising a narrow slot portion with a thickened slot portion extending from at least one end of the narrow slot portion.

14. The inflatable knee bolster module assembly of claim 1 wherein the at least first and second longitudinally spaced apart attachment extensions are formed by a doubling of the inflatable knee cushion first outer lateral side onto itself and which at least first and second longitudinally spaced apart attachment extensions extend in an outward direction from the inflatable knee cushion.

15. The inflatable knee bolster module assembly of claim 1 wherein at least the first longitudinally spaced apart attachment extension of the inflatable knee cushion forms a slot and wherein the at least the one of the reaction housing and the load distributor panel joined with the first outer lateral side additionally comprises an attachment projection extending therefrom in a direction opposite the inflatable knee cushion, with the attachment projection extendable through the attachment extension slot.

16. An inflatable knee bolster module assembly comprising:
    an inflatable knee cushion having opposed first and second outer lateral sides with at least the first outer lateral side having at least first and second longitudinally spaced apart attachment extensions;

a reaction housing joined with one of the first and second outer lateral sides of the inflatable knee cushion;

a load distributor panel joined with the other of the first and second outer lateral sides of the inflatable knee cushion;

wherein the one of the reaction housing and the load distributor panel joined with the first outer lateral side includes at least first and second longitudinally spaced apart attachment openings respectively corresponding to the first and second longitudinally spaced apart attachment extensions of the inflatable knee cushion with the first attachment extension extending through the first attachment opening in secured relationship and the second attachment extension extending through the second attachment opening in secured relationship and wherein at least the first longitudinally spaced apart attachment extension of the inflatable knee cushion forms a slot and wherein the at least the one of the reaction housing and the load distributor panel joined with the first outer lateral side additionally comprises an attachment projection extending therefrom in a direction opposite the inflatable knee cushion, with the attachment projection extendable through the attachment extension slot.

17. An inflatable knee bolster module assembly comprising:

an inflatable knee cushion having opposed first and second outer lateral sides with at least the first outer lateral side having at least first and second longitudinally spaced apart attachment extensions;

a reaction housing joined with one of the first and second outer lateral sides of the inflatable knee cushion;

a load distributor panel joined with the other of the first and second outer lateral sides of the inflatable knee cushion;

wherein the one of the reaction housing and the load distributor panel joined with the first outer lateral side includes at least first and second longitudinally spaced apart attachment openings respectively corresponding to the first and second longitudinally spaced apart attachment extensions of the inflatable knee cushion with the first attachment extension extending through the first attachment opening in secured relationship and the second attachment extension extending through the second attachment opening in secured relationship, wherein at least the first attachment opening comprises an opening of non-uniform shape through the one of the reaction housing and the load distributor panel joined with the first outer lateral side, and wherein the non-uniform shape opening is in the form of a keyed slot comprising a narrow slot portion with a thickened slot portion extending from at least one end of the narrow slot portion.

18. In an inflatable knee bolster module assembly which includes an inflatable knee cushion having opposed first and second outer lateral sides, a first panel member comprising a reaction housing panel and a second panel member comprising a load distributor panel, the improvement comprising:

at least the first outer lateral side of the inflatable knee cushion having at least first and second longitudinally spaced apart attachment extensions;

at least one of the first and second panel members having at least first and second longitudinally spaced apart attachment openings respectively corresponding to the first and second longitudinally spaced apart attachment extension of the inflatable knee cushion with the first attachment extension extending through the first attachment opening in secured relationship and the second attachment extension extending through the second attachment opening in secured relationship; and at least the first longitudinally spaced apart attachment extension of the inflatable knee cushion forms a slot and wherein the at least the one of the reaction housing and the load distributor panel joined with the first outer lateral side additionally comprises an attachment projection extending therefrom in a direction opposite the inflatable knee cushion, with the attachment projection extendable through the attachment extension slot.

19. In an inflatable knee bolster module assembly which includes an inflatable knee cushion and at least one panel member selected from the group of a reaction housing panel and a load distributor panel, a method for attaching the inflatable knee cushion with the at least one panel member, the method consisting essentially of:

passing first and second longitudinally spaced apart attachment extensions of a first outer lateral side of the inflatable knee cushion through, respectively corresponding first and second attachment openings in the at least one panel member, in secured relationship, wherein at least the first longitudinally spaced apart attachment extension of the inflatable knee cushion is in the form of a first material loop and wherein the passing of the first longitudinally spaced apart attachment extension through the first attachment opening in the at least one panel member in secured relationship comprises:

securing a first, retention rod to the first material loop and then passing the rod-secured material loop through the first attachment opening and wherein the securing of the first retention rod to the first material loop comprises sewing the first retention rod to the cushion material loop.

20. In an inflatable knee bolster module assembly which includes an inflatable knee cushion and at least one panel member selected from the group of a reaction housing panel and a load distributor panel, a method for attaching the inflatable knee cushion with the at least one panel member, the method consisting essentially of:

passing first and second longitudinally spaced apart attachment extensions of a first outer lateral side of the inflatable knee cushion through, respectively corresponding first and second attachment openings in the at least one panel member, in secured relationship, and wherein at least the first longitudinally spaced apart attachment extension of the inflatable knee cushion is in the form of a first material loop containing an elongated retention rod and wherein the passing of the first longitudinally spaced apart attachment extension through the first attachment opening in the at least one panel member in secured relationship comprises:

inserting the elongated retention rod-containing first material loop through a keyed slot formed attachment opening formed in the at least one panel member.

21. In an inflatable knee bolster module assembly which includes an inflatable knee cushion and at least one panel member selected from the group of a reaction housing panel and a load distributor panel, a method for attaching the inflatable knee cushion with the at least one panel member, the method consisting essentially of:

passing first and second longitudinally spaced apart attachment extensions of a first outer lateral side of the inflatable knee cushion through, respectively corresponding first and second attachment openings in the at least one panel member, in secured relationship, and wherein at least the first longitudinally spaced apart attachment extension of the inflatable knee cushion forms a slot and wherein the at least one panel member additionally comprises an attachment projection extending therefrom in a direction opposite the inflatable knee cushion, wherein the step of passing the first longitudinally spaced apart attachment extension through a corresponding first attachment opening in the at least one panel member in secured relationship comprises:

extending the attachment projection through the attachment extension slot.

22. An inflatable knee bolster module assembly comprising:

an inflatable knee cushion having opposed first and second outer lateral sides with at least the first outer lateral side having at least first and second longitudinally spaced apart attachment extensions;

a load distributor panel joined with the first outer lateral side of the inflatable knee cushion;

a reaction housing joined with the second outer lateral sides of the inflatable knee cushion; and a bolster panel joined with the load distributor panel;

wherein the load distributor panel includes a first planar surface adjacent the inflatable knee cushion, an opposed second planar surface adjacent the bolster panel and includes at least first and second longitudinally spaced apart attachment openings extending between the first and second planar surfaces and respectively corresponding to the first and second longitudinally spaced apart attachment extensions of the inflatable knee cushion with the first attachment extension extending through the first attachment opening to the second planar surface in secured relationship and the second attachment extension extending through the second attachment opening to the second planar surface in secured relationship.

23. The inflatable knee bolster module assembly of claim 22 wherein at least the first longitudinally spaced apart attachment extension of the inflatable knee cushion is in the form of a material loop and wherein the module assembly additionally comprises a retention rod extendable through the material loop attachment extension to prevent withdrawal of the material loop attachment extension through the first attachment opening.

24. The inflatable knee bolster module assembly of claim 23 wherein the retention rod includes at least one retention feature extending therefrom to prevent the unintended withdrawal of the retention rod from the material loop attachment extension.

25. The inflatable knee bolster module assembly of claim 23 wherein the retention rod and the material loop are sewn together.

26. The inflatable knee bolster module assembly of claim 22 wherein at least the first attachment opening comprises at least two laterally spaced apart slot openings through the load distributor panel joined.

27. The inflatable knee bolster module assembly of claim 22 wherein at least the first attachment opening comprises an opening of non-uniform shape through the load distributor.

28. The inflatable knee bolster module assembly of claim 27 wherein the non-uniform shape opening is in the form of a keyed slot comprising a narrow slot portion with a thickened slot portion extending from at least one end of the narrow slot portion.

29. In an inflatable knee bolster module assembly which includes an inflatable knee cushion, a load distributor panel and a bolster panel joined with the load distributor panel, wherein the load distributor panel includes a first planar surface adjacent the inflatable knee cushion, an opposed second planar surface adjacent the bolster panel and includes first and second longitudinally spaced apart attachment openings extending between the first and second planar surfaces, a method for attaching the inflatable knee cushion with the load distributor panel, the method comprising:

passing first and second longitudinally spaced apart attachment extensions of a first outer lateral side of the inflatable knee cushion through the respectively corresponding first and second attachment openings in the load distributor panel to the second planar surface in secured relationship.

* * * * *